(12) United States Patent
Ikuta

(10) Patent No.: US 10,318,215 B2
(45) Date of Patent: Jun. 11, 2019

(54) DATA TRANSMISSION AND STORAGE CONTROL METHODS FOR IMAGE FORMING SYSTEMS

(71) Applicant: Konica Minolta, Inc., Chiyoda-ku, Tokyo (JP)

(72) Inventor: Masaya Ikuta, Fuchu (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 15/938,669

(22) Filed: Mar. 28, 2018

(65) Prior Publication Data

US 2018/0300089 A1 Oct. 18, 2018

(30) Foreign Application Priority Data

Apr. 17, 2017 (JP) .................................. 2017-81428

(51) Int. Cl.
| | |
|---|---|
| *G06F 15/00* | (2006.01) |
| *G06F 3/12* | (2006.01) |
| *G06K 1/00* | (2006.01) |
| *G03G 15/00* | (2006.01) |
| *H04N 1/00* | (2006.01) |
| *H04L 12/26* | (2006.01) |

(52) U.S. Cl.
CPC ......... *G06F 3/122* (2013.01); *G03G 15/5075* (2013.01); *G06F 3/1204* (2013.01); *G06F 3/1205* (2013.01); *G06F 3/1211* (2013.01); *G06F 3/1215* (2013.01); *G06F 3/1261* (2013.01); *G06F 3/1291* (2013.01); *G06F 3/1295* (2013.01); *H04L 43/16* (2013.01); *H04N 1/0001* (2013.01); *H04N 1/0009* (2013.01); *G03G 15/5083* (2013.01); *G03G 2215/00021* (2013.01); *H04L 43/0888* (2013.01)

(58) Field of Classification Search
CPC ...... G06F 3/122; G06F 3/1204; G06F 3/1215; G06F 3/1295; G06G 15/5075; H04N 1/0001; H04N 1/0009; H04L 43/16; H04L 43/0888
USPC ........................................ 358/1.1, 1.15, 1.14
See application file for complete search history.

(56) References Cited

U.S. PATENT DOCUMENTS

| | | | | |
|---|---|---|---|---|
| 2001/0042142 A1* | 11/2001 | Fukunaga | ........... | G06F 13/4291 710/11 |
| 2012/0307297 A1* | 12/2012 | Teshima | ................ | G06F 3/1215 358/1.15 |

FOREIGN PATENT DOCUMENTS

JP 2006121438 A 5/2006

* cited by examiner

*Primary Examiner* — Douglas Q Tran
(74) *Attorney, Agent, or Firm* — Baker & Hostetler, LLP

(57) ABSTRACT

An image forming system which suppresses the decline in printing speed without user intervention when the speed of data transmission to a storage does not meet an allowable speed, and a control method for the system. A first acquisition part acquires the speed of data transmission to the storage of each of plural image forming apparatuses and a second acquisition part acquires the data transmission speed between image forming apparatuses. When the speed of data transmission to a given image forming apparatus among the apparatuses is lower than a specified value, if the speed of data transmission to the storage of another image forming apparatus and the data transmission speed between image forming apparatuses are both higher than a given value, a striping part performs striping to distribute and store data into the storage of the given image forming apparatus and the storage of the other image forming apparatus.

11 Claims, 13 Drawing Sheets

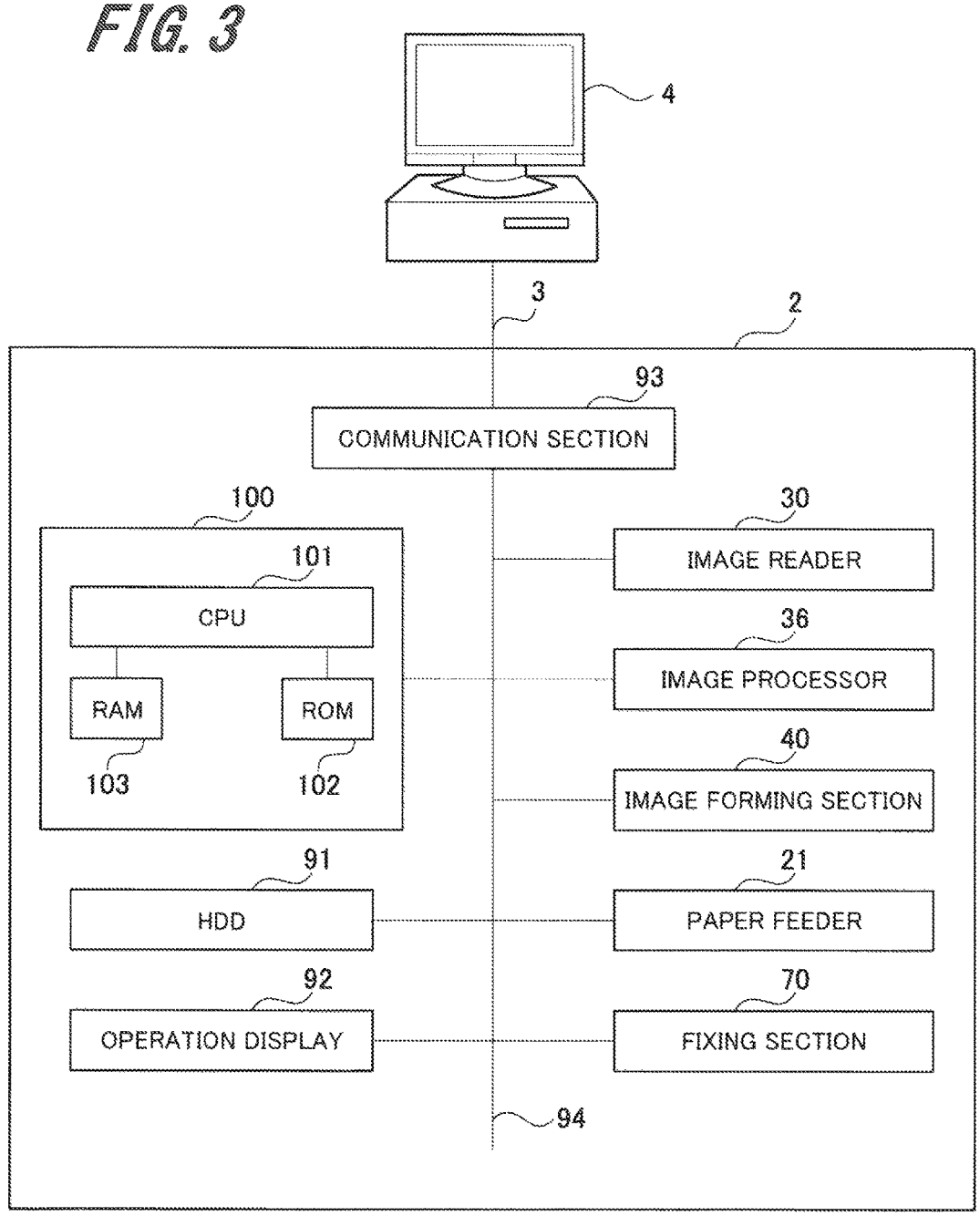

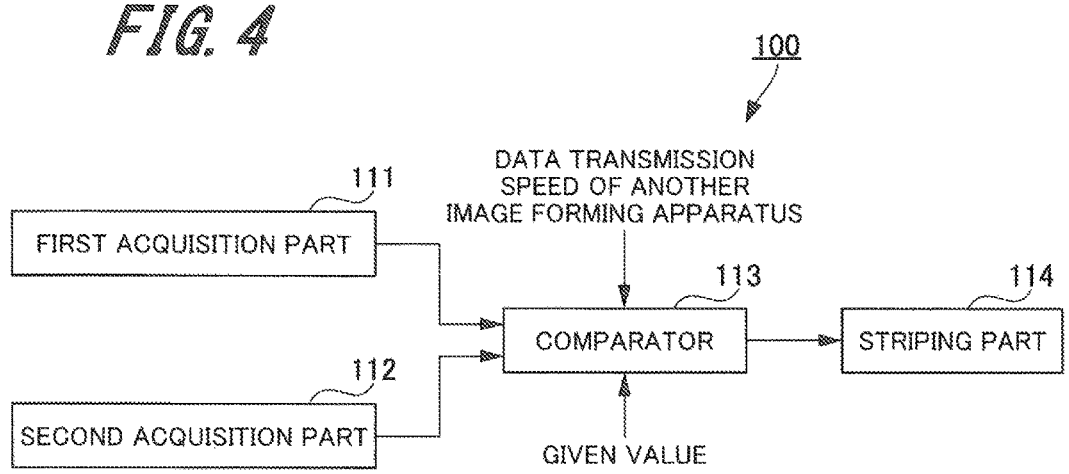
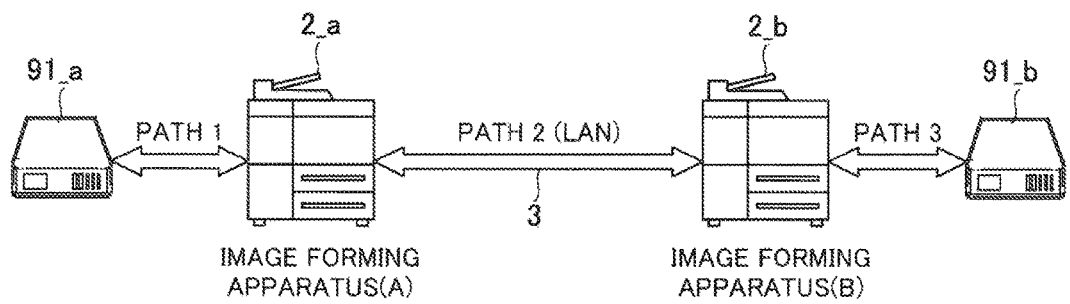

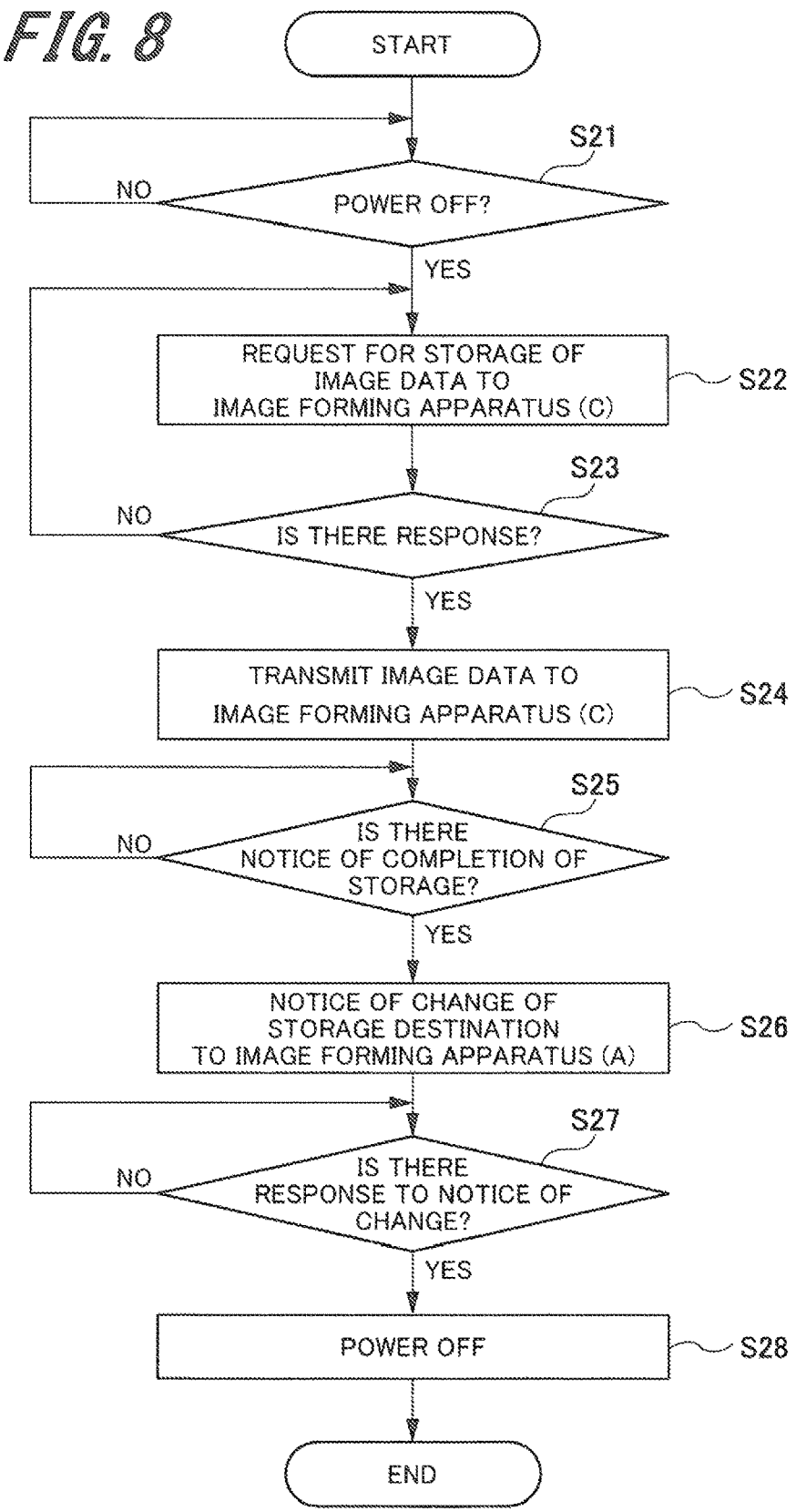

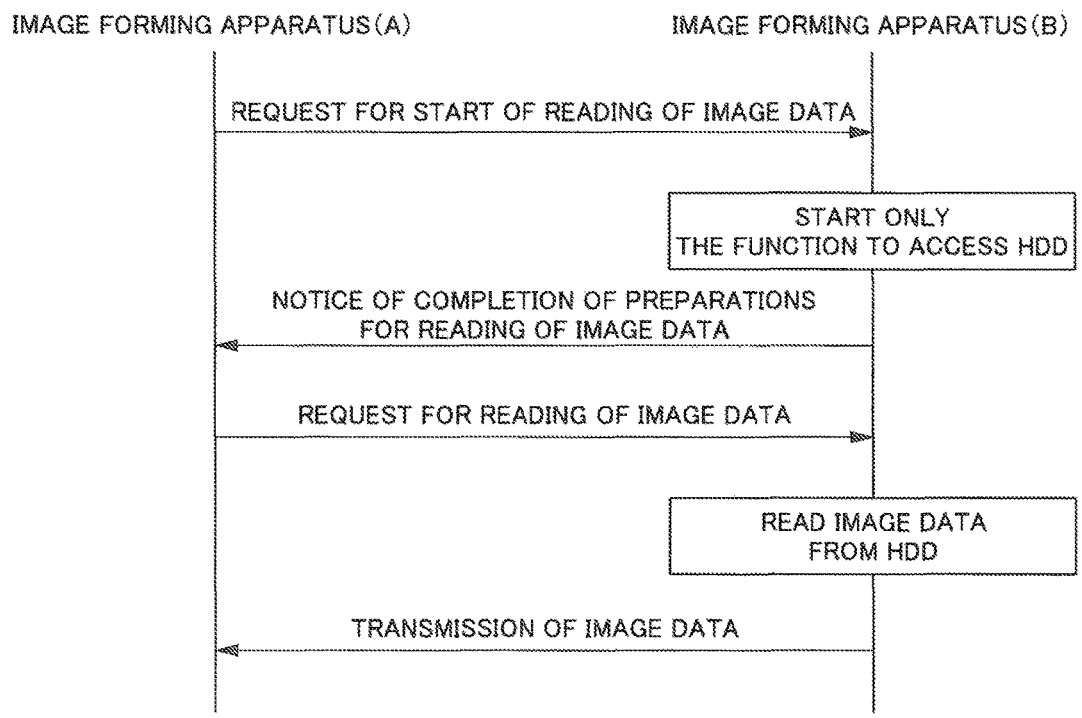

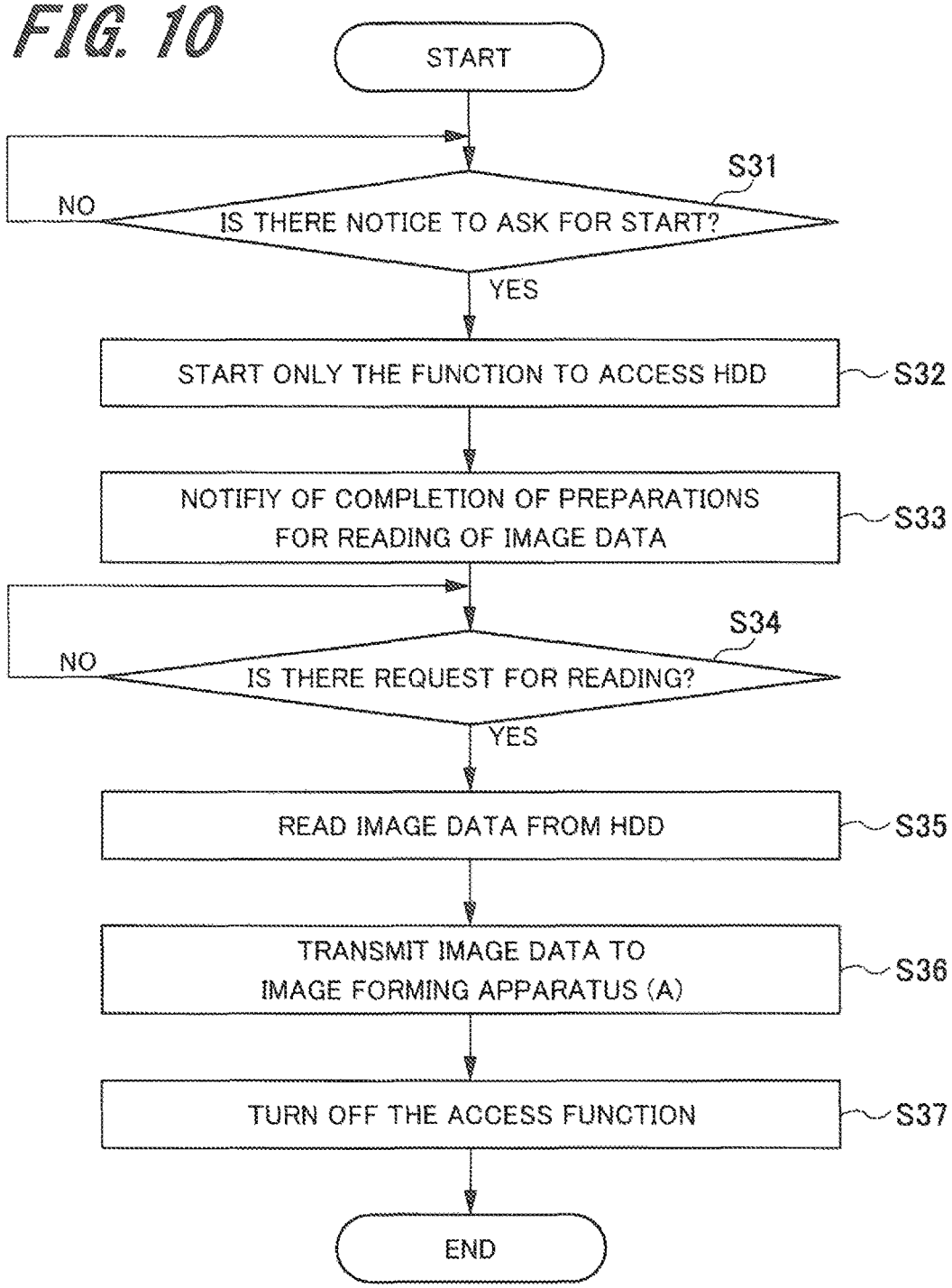

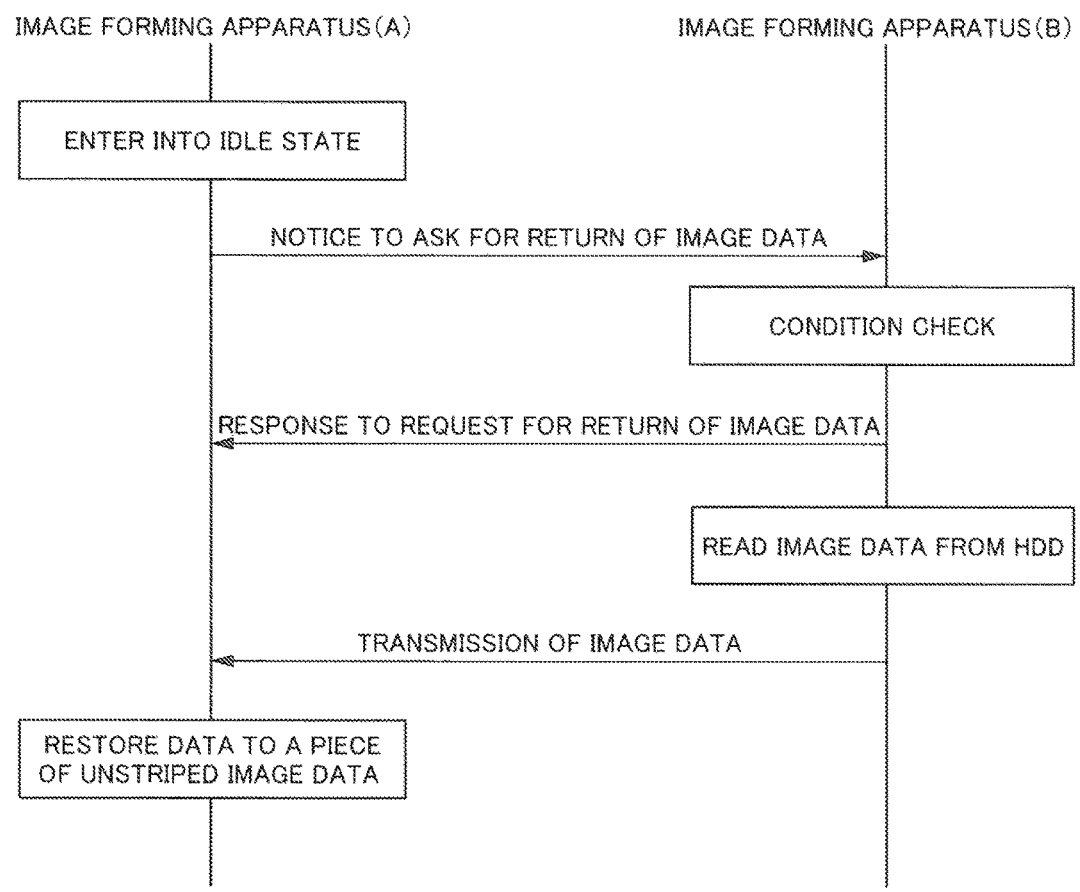

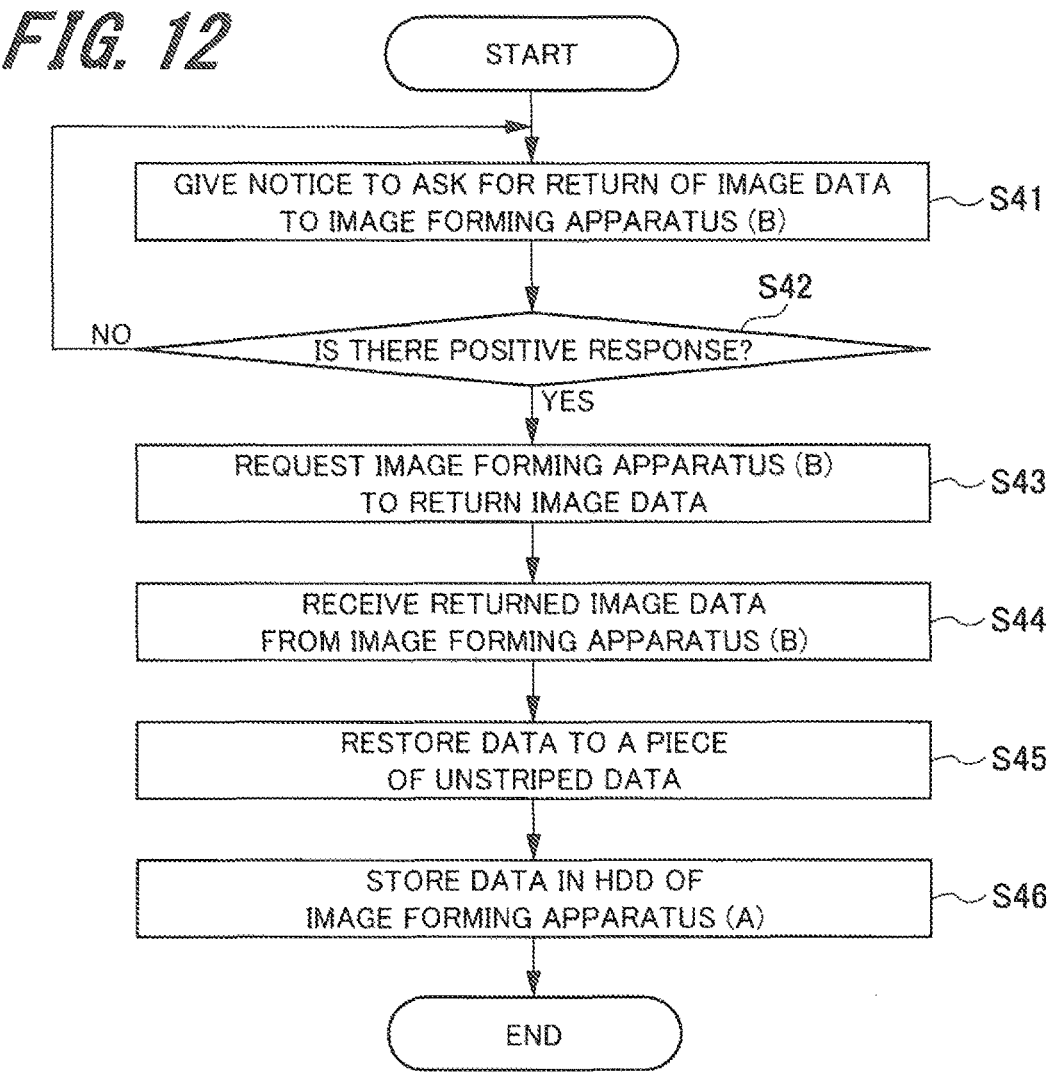

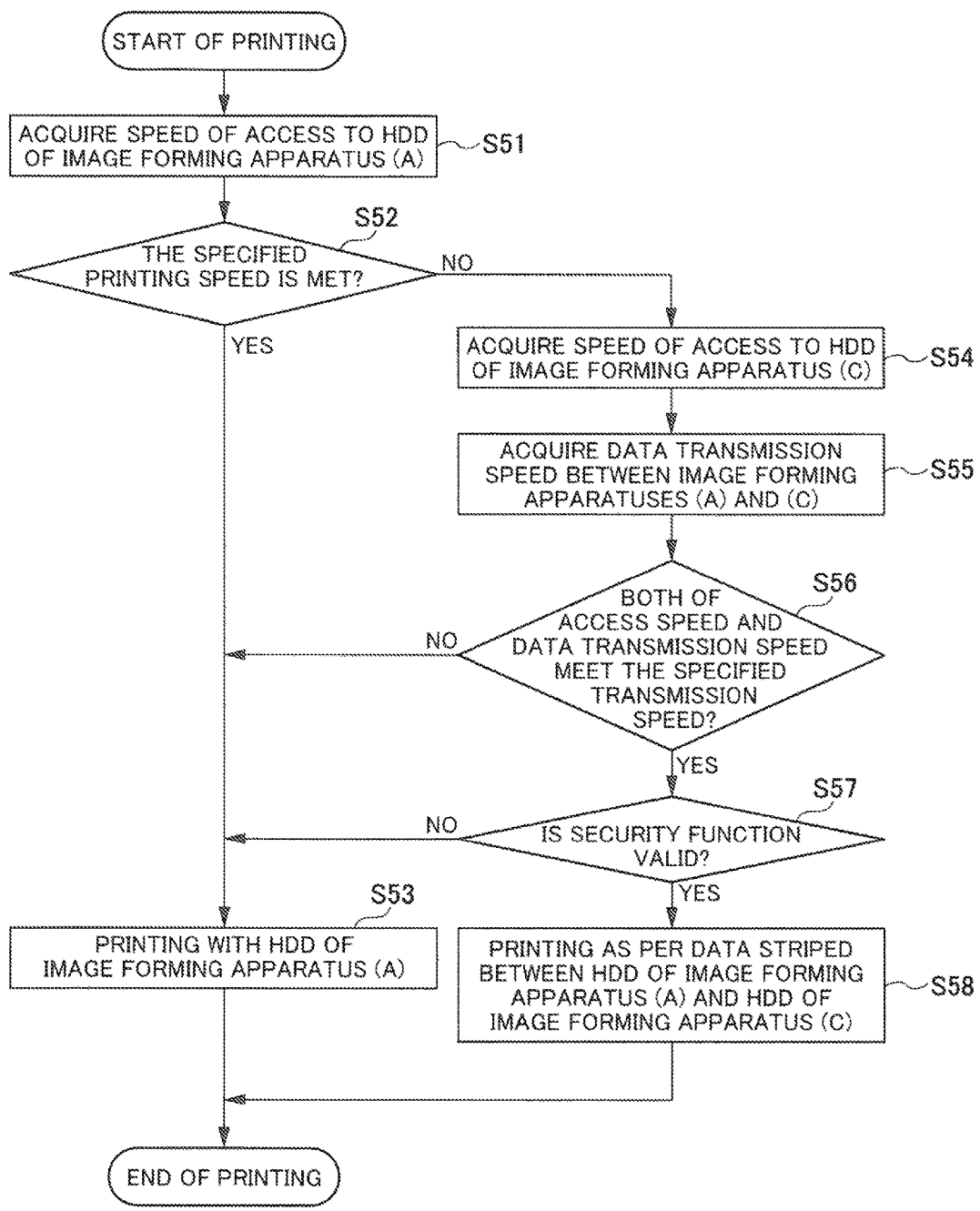

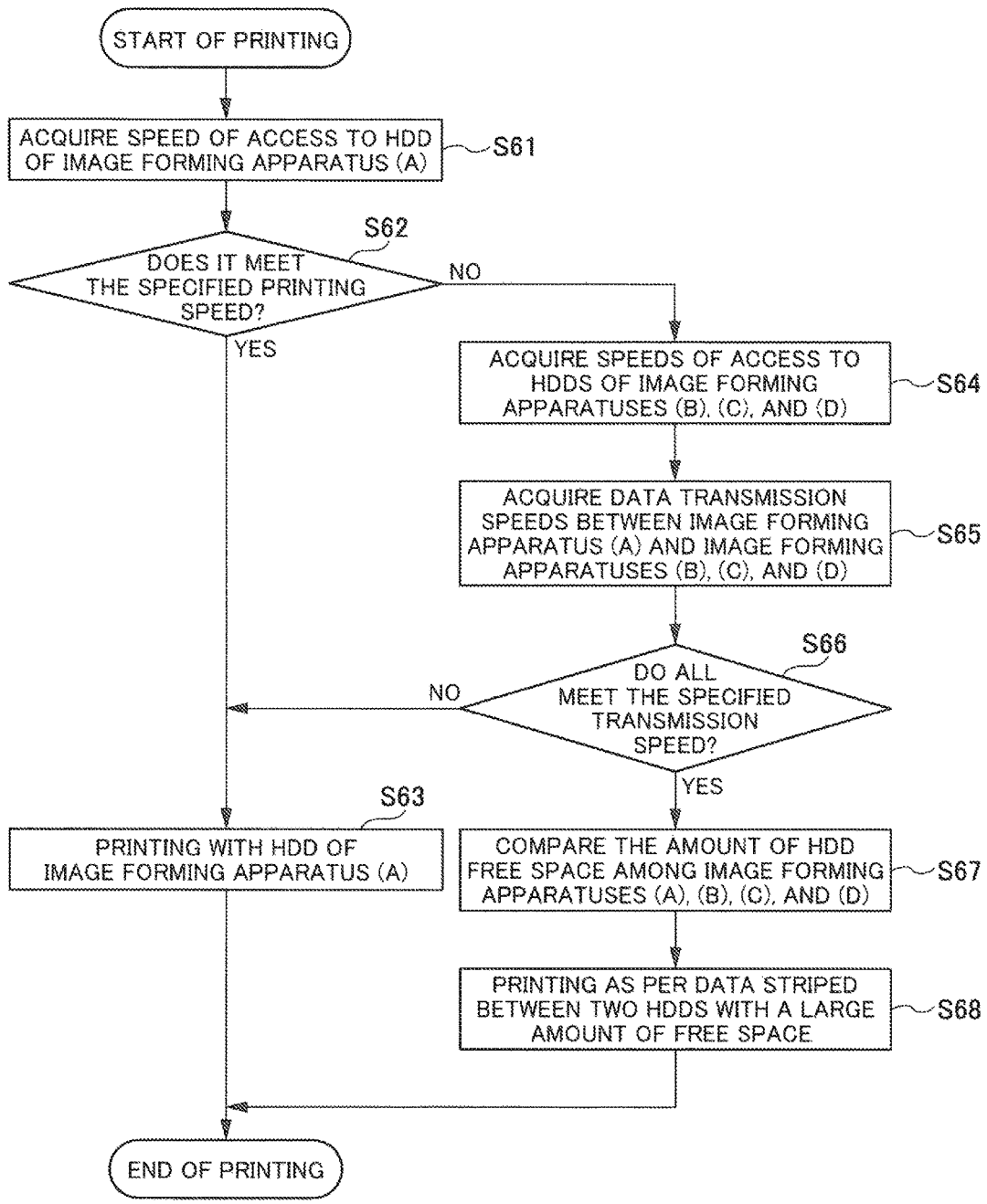

DATA TRANSMISSION AND STORAGE CONTROL METHODS FOR IMAGE FORMING SYSTEMS

CROSS-REFERENCE TO RELATED APPLICATIONS

The entire disclosure of Japanese Patent Application No. 2017-81428, filed on Apr. 17, 2017, is incorporated herein by reference in its entirety.

BACKGROUND

An image forming apparatus has a storage such as an HDD (Hard Disk Drive) or SSD (Solid State Drive) to perform a printing process or scanning process through the storage. Therefore, if the storage is excessively accessed because of combined operation of printing and scanning or another reason, the speed of data transmission to the storage declines and as a consequence, the printing speed declines.

One technique to solve the above problem is that if the speed of data transmission to the storage does not meet the allowable speed, a warning is given to the user and upon receipt of the warning the user manually installs an additional storage to increase the speed of data transmission to the storage by striping with the additional storage (for example, see Patent Literature 1).

Technological Field

The present invention relates to an image forming system and a method for controlling the image forming system.

DESCRIPTION OF THE RELATED ART

Patent Literature 1: JP-A-2006-121438

SUMMARY

In the related art described in Patent Literature 1, if the speed of data transmission to the storage does not meet the allowable speed, the user must intervene to solve the problem. Specifically, each time the speed of data transmission to the storage does not meet the allowable speed, the user must install a storage manually. Thus, the related art is less user-friendly because the user must intervene whenever the speed of data transmission to the storage does not meet the allowable speed.

Therefore, an object of the present invention is to provide an image forming system which suppresses the decline in printing speed without user intervention even if the speed of data transmission to the storage does not meet the allowable speed, and a method for controlling the image forming system.

To achieve at least one of the abovementioned objects, according to an aspect of the present invention, an image forming system reflecting one aspect of the present invention is an image forming system in which a plurality of image forming apparatuses are connected on a network and the image forming apparatuses each include:

a first acquisition part acquiring a speed of data transmission to a storage of each image forming apparatus;

a second acquisition part acquiring a data transmission speed between image forming apparatuses; and a striping part which, when in a given image forming apparatus among the image forming apparatuses the data transmission speed acquired by the first acquisition part is lower than a specified value, if in another image forming apparatus the data transmission speed acquired by the first acquisition part and the data transmission speed acquired by the second acquisition part are both higher than a given value, distributes and stores data into the storage of the given image forming apparatus and the storage of the other image forming apparatus.

Furthermore, a method for controlling an image forming system reflecting one aspect of the present invention is a method for controlling an image forming system in which a plurality of image forming apparatuses are connected on a network and the method uses a non-transitory computer-readable storage medium storing a program causing a computer to perform:

acquiring a speed of data transmission to a storage of each of the image forming apparatuses;

acquiring a data transmission speed between image forming apparatuses; and when the speed of data transmission to the storage of a given image forming apparatus among the image forming apparatuses is lower than a specified value, if the speed of data transmission to the storage of another image forming apparatus and the data transmission speed between image forming apparatuses are both higher than a given value, distributing and storing data into the storage of the given image forming apparatus and the storage of the other image forming apparatus.

In the above image forming system or the control method therefor, when the speed of data transmission to the storage of a given (a certain) image forming apparatus is lower than the specified value, the speed of data transmission to the storage of another image forming apparatus and the data transmission speed between image forming apparatuses are compared with the given value. If both are higher than the given value, data can be distributed and stored (saved) using the storage of the other image forming apparatus on the same network. Here, one or two or more other image forming apparatuses on the same network may be used. Thus, by using the storage of another image forming apparatus on the same network, the speed of data transmission to the storage can be increased to the allowable speed without forcing the user to add a storage, namely without user intervention.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a block diagram which shows an example of the control system configuration of the image forming apparatus;

FIG. 4 is a functional block diagram which shows an example of the functions of the controller;

FIG. 5 is a diagram which explains details of the functional parts of the controller;

FIG. 8 is a flowchart which shows an example of the processing sequence in Example 2;

FIG. 9 is a ladder diagram which conceptually shows an example of operation in Example 3;

FIG. 10 is a flowchart which shows an example of the processing sequence in Example 3;

FIG. 11 is a ladder diagram which conceptually shows an example of operation in Example 4;

FIG. 12 is a flowchart which shows an example of the processing sequence in Example 4;

FIG. 13 is a flowchart which shows an example of the processing sequence in Example 5; and FIG. 14 is a flowchart which shows an example of the processing sequence in Example 6.

DETAILED DESCRIPTION OF EMBODIMENTS

Hereinafter, embodiments of the present invention will be described with reference to the drawings. However, the scope of the invention is not limited to the disclosed embodiments. In the explanation given below and the drawings, the same elements or elements with the same functions are designated by the same reference signs and descriptions thereof are not repeated.

[Configuration of the Image Forming System]

Figure 1:
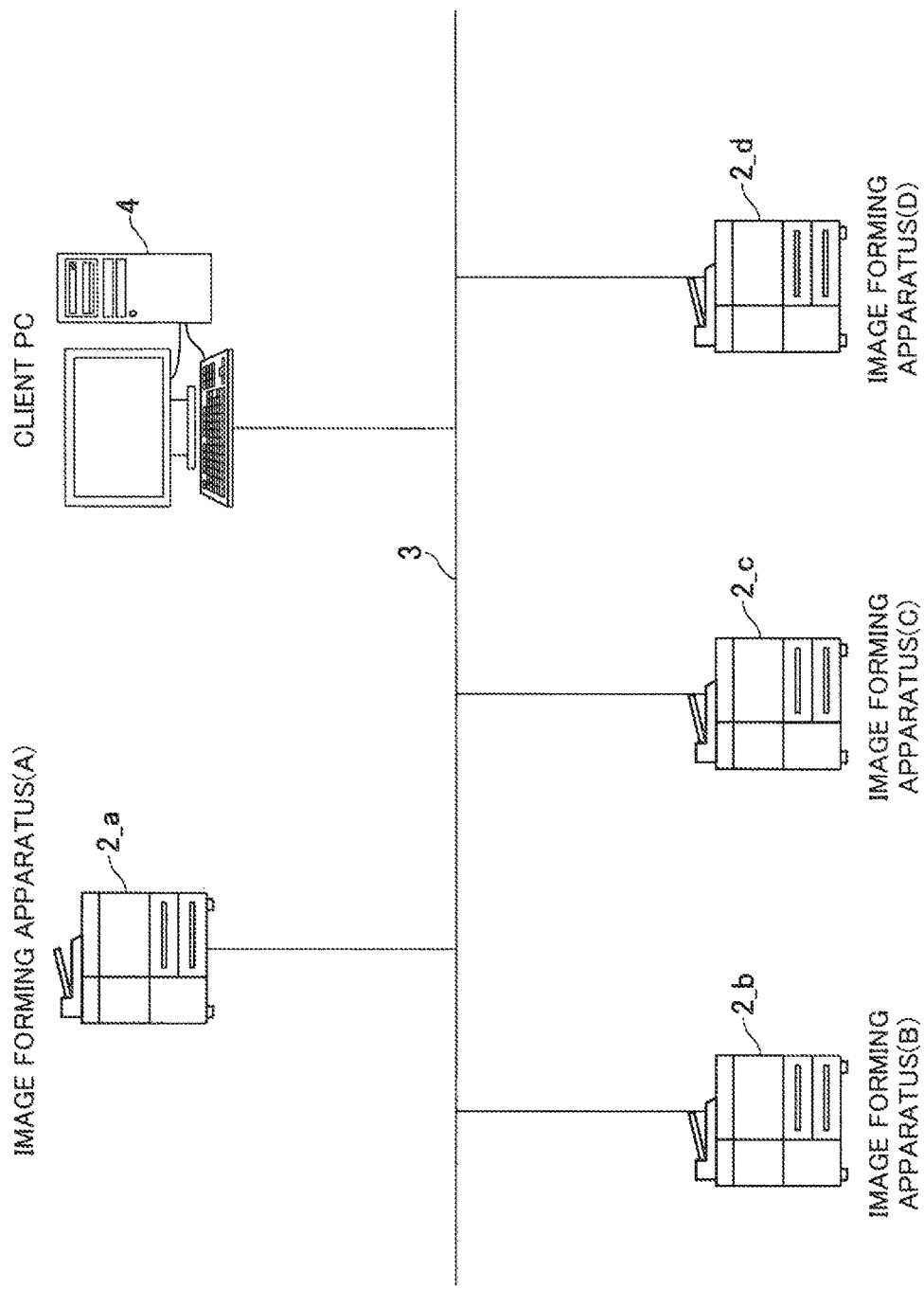
FIG. 1 is a diagram which schematically shows the configuration of an image forming system according to an embodiment of the present invention.

FIG. 1 is a diagram which schematically shows the configuration of an image forming system according to an embodiment of the present invention.

As shown in FIG. 1, the image forming system 1 according to the present embodiment is configured so that a plurality of image forming apparatuses 2, for example, four image forming apparatuses 2_a, 2_b, 2_c, and 2_d, are connected on a LAN (Local Area Network) cable 3 as an example of a network, in a mutually communicable manner. The LAN cable 3 is further connected, for example, to one client PC (personal computer) 4.

As Ethernet (registered trademark) as a LAN communication protocol, 10-gigabit Ethernet, a high-speed communication protocol which can transmit data at ten times higher speed than the former 1-gigabit Ethernet is available. The image forming system 1 according to the present embodiment uses the 10-gigabit Ethernet as a LAN communication protocol.

The image forming apparatuses 2_a, 2_b, 2_c, and 2_d can be exemplified by copiers. As will be described later, the image forming apparatuses 2_a, 2_b, 2_c, and 2_d each have (incorporate) a storage (memory). The storage may be an internal memory built in each of the image forming apparatuses 2_a, 2_b, 2_c, and 2_d or an external memory. In the image forming apparatuses 2_a, 2_b, 2_c, and 2_d, printing and scanning are performed through the storage.

In the image forming apparatuses 2_a, 2_b, 2_c, and 2_d, combined operation of printing and scanning can be done. In combined operation, excessive access to the storage occurs. If excessive access to the storage occurs because of combined operation or another reason, the speed of data transmission to the storage declines. In addition, not only in the case of excessive access to the storage but also in the case of deterioration of the storage, the speed of data transmission to the storage may decline. A decline in the speed of data transmission to the storage results in a decline in printing speed.

Hereinafter, the image forming apparatuses 2_a, 2_b, 2_c, and 2_d may be collectively called the image forming apparatus 2.

[General Configuration of the Image Forming Apparatus]

Figure 2:
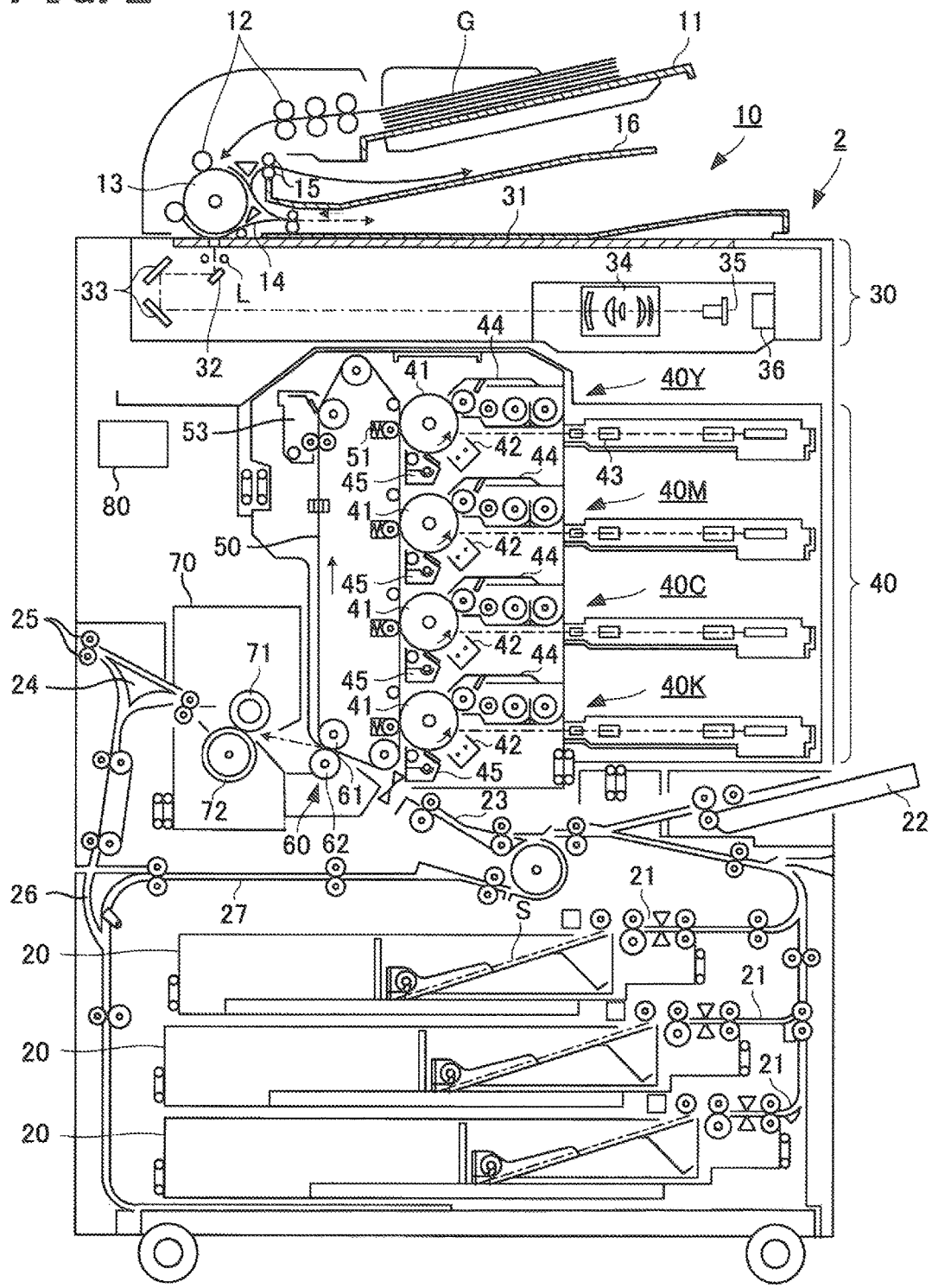
FIG. 2 is a general configuration diagram which schematically shows the configuration of an image forming apparatus.

FIG. 2 is a general configuration diagram which schematically shows the configuration of the image forming apparatus. The figure illustrates the configuration of a copier as an example of the general configuration of the image forming apparatus 2 (2_a, 2_b, 2_c, 2_d).

The image forming apparatus 2 in this example is a tandem color image forming apparatus based on an electrophotographic method using static electricity to form an image, in which four color toners, yellow (Y), magenta (M), cyan (C), and black (K), are superimposed one upon another. The image forming apparatus 2 includes an original conveyor 10, a paper case 20, an image reader 30, an image forming section 40, an intermediate transfer belt 50, a secondary transfer part 60, a fixing section 70, and a control board 80.

The original conveyor 10 includes an original feed tray 11, a plurality of rollers 12, a conveyance drum 13, a conveyance guide 14, original discharge rollers 15, and an original discharge tray 16. Original sheets G placed on the original feed tray 11 are conveyed one by one to the reading position in the image reader 30 by the rollers 12 and conveyance drum 13. The conveyance guide 14 and original discharge rollers 15 discharge the original sheets G conveyed by the rollers 12 and conveyance drum 13, to the original discharge tray 16.

The image reader 30 reads the image of the original G conveyed by the original conveyor 10 or an original placed on an original holder 31 and generates image data. Specifically, the image of the original G is irradiated by a lamp L. The reflected light from the original G irradiated with light from the lamp L is guided by a first mirror unit 32, a second mirror unit 33, and a lens unit 34 sequentially to the light receiving surface of an imaging element 35 where an image is formed. The imaging element 35 photo-electrically converts the incoming light and outputs a given image signal. The image signal sent from the imaging element 35 is A/D converted to generate image data.

The image reader 30 includes an image processor 36. The image processor 36 processes the image data generated by the A/D conversion in the image reader 30, using known image processing techniques such as shading correction, dithering and compression, and stores the data in a RAM 103 (see FIG. 3) of a controller 100 mounted on the control board 80. Image data is not limited to data sent from the image reader 30; instead, image data may be data received from an external device such as a personal computer connected to the image forming apparatus 2 or another image forming apparatus.

The paper case 20 is located in the lower part of the apparatus body. Several paper cases are provided according to the size and type of sheet of paper S as an example of a recording medium. The sheet of paper S is sent to a conveyor 23 by a paper feeder 21 and conveyed by the conveyor 23 to the secondary transfer part 60 as a transfer position. A manual paper feeder 22 is provided near the paper case 20. A sheet of paper different in size from the sheets housed in the paper case 20, or a special sheet such as a tag sheet or OHP sheet is placed in the manual paper feeder 22 by the user and sent to the transfer position.

The image forming section 40 and intermediate transfer belt 50 are located between the image reader 30 and the paper case 20. The image forming section 40 includes four image forming units 40Y, 40M, 40C and 40K to form color toner images of yellow (Y), magenta (M), cyan (C), and black (K).

The image forming unit 40Y forms a yellow toner image and the image forming unit 40M forms a magenta toner image. The image forming unit 40C forms a cyan toner image and the image forming unit 40K forms a black toner image. These four image forming units 40Y, 40M, 40C, and 40K have the same structure. Thus, the image forming unit 40Y, which forms a yellow toner image, is described below.

The image forming unit 40Y includes a drum-like photoreceptor (photoreceptor drum) 41, an electrifying part 42 placed around the photoreceptor 41, an exposure part 43, a development part 44, and a cleaning device 45. The photoreceptor 41 is driven by a drive motor (not shown) to rotate. The electrifying part 42 gives electric charge to the photoreceptor 41 to electrify the surface of the photoreceptor 41 evenly. The exposure part 43 exposes the surface of the photoreceptor 41 to light according to the image data read from the original G or the image data sent from an external apparatus to form an electrostatic latent image.

The development part 44 develops the electrostatic latent image formed on the photoreceptor 41 using a 2-component developer containing toner and carrier. Toner is particles to form an image. Carrier has the function to give appropriate electric charge to toner by frictional electrification in mixing with toner in the development part 44, the function to convey the toner to the development area facing the photoreceptor 41, and the function to generate a development field to enable the toner to develop an image faithful to the electrostatic latent image on the photoreceptor 41. The development part 44 makes the yellow toner adhere to the electrostatic latent image formed on the photoreceptor 41. Consequently, a yellow toner image is formed on the surface of the photoreceptor 41.

The development part 44 of the image forming unit 40M makes the magenta toner adhere to the photoreceptor 41 of the image forming unit 40M. The development part 44 of the image forming unit 40C makes the cyan toner adhere to the photoreceptor 41 of the image forming unit 40C. The development part 44 of the image forming unit 40K makes the black toner adhere to the photoreceptor 41 of the image forming unit 40K.

The cleaning device 45 cleans the surface of the photoreceptor 41 after the toner adhering to the photoreceptor 41 is transferred to the intermediate transfer belt 50. Specifically, the cleaning device 45 removes residues (accretion) such as toner remaining on the surface of the photoreceptor 41 (residual toner).

The toner adhering to the photoreceptor 41 is transferred to the intermediate transfer belt 50. The intermediate transfer belt 50 is endless and wound around several rollers. The intermediate transfer belt 50 is driven by a drive motor (not shown) to rotate clockwise, or in the direction opposite to the direction of rotation of the photoreceptor 41. A primary transfer part 51 is provided on the intermediate transfer belt 50 at a point corresponding to the photoreceptor 41 of each of the image forming units 40Y, 40M, 40C, and 40K.

The primary transfer part 51 transfers the toner adhering to the photoreceptor 41 to the intermediate transfer belt 50 by applying, to the intermediate transfer belt 50, a voltage with opposite polarity to the polarity of the toner. As the intermediate transfer belt 50 rotates, the toner images formed by the four image forming units 40Y, 40M, 40C, and 40K are sequentially transferred to the surface of the intermediate transfer belt 50. Consequently, the yellow, magenta, cyan, and black toner images are superimposed to form a color image on the intermediate transfer belt 50.

A cleaning device 53 is located opposite to the intermediate transfer belt 50. The cleaning device 53 cleans the surface of the intermediate transfer belt 50 after the toner images transferred to the intermediate transfer belt 50 are transferred to the sheet S. Specifically, the cleaning device 53 removes residues (accretion) such as toner (residual toner) remaining on the surface of the intermediate transfer belt 50.

The secondary transfer part 60 is located near the intermediate transfer belt 50 on the downstream side in the sheet conveying direction of the conveyor 23. The secondary transfer part 60 includes a pair of transfer rollers which are an upper transfer roller 61 across which the intermediate transfer belt 50 is laid, and a lower transfer roller 62 pressed toward the upper transfer roller 61 with the intermediate transfer belt 50 between them. The secondary transfer part 60 causes the sheet S conveyed by the conveyor 23 to come into contact with the intermediate transfer belt 50 to transfer the toner image formed on the outer surface of the intermediate transfer belt 50 to the sheet S.

The fixing section 70 is located on the sheet S discharge side of the secondary transfer part 60. The fixing section 70 pressurizes and heats the sheet S to fix the transferred toner image on the sheet S. For example, the fixing section 70 includes a pair of fixing members which are an upper fixing roller 71 and a lower fixing roller 72. The upper fixing roller 71 and lower fixing roller 72 are in pressure contact with each other so that the part of pressure contact between the upper fixing roller 71 and lower fixing roller 72 forms a fixing nip part.

A heater is built in the upper fixing roller 71. The roller portion of the upper fixing roller 71 is heated by radiant heat from the heater. The heat of the roller portion of the upper fixing roller 71 is transmitted to the sheet S so that the toner image is fixed on the sheet S.

The sheet S is conveyed in a manner that the sheet surface (object of fixing) to which the toner image has been transferred by the secondary transfer part 60 faces the upper fixing roller 71, and passes through the fixing nip part. Thus, the sheet S passing through the fixing nip part is pressurized by the upper fixing roller 71 and lower fixing roller 72 and heated by the heat of the roller portion of the upper fixing roller 71.

A switching gate 24 is located downstream of the fixing section 70 in the sheet S conveying direction. The switching gate 24 changes the conveyance path for the sheet S which has passed through the fixing section 70. Specifically, if an image is formed on one face of the sheet S and the sheet is to be discharged with the image face up, the switching gate 24 makes the sheet S move straight. Consequently, the sheet S is discharged by a pair of discharge rollers 25. On the other hand, if an image is formed on one face of the sheet S and the sheet is to be discharged with the image face down, or if images are formed on both the faces of the sheet S, the switching gate 24 guides the sheet S downward.

If the sheet is to be discharged with the image face down, after the switching gate 24 guides the sheet S downward, a sheet reversal conveyor 26 reverses the sheet S and conveys the sheet S upward. Consequently, the reversed sheet S is discharged by the pair of discharge rollers 25. If images are to be formed on both the faces of the sheet S, the switching gate 24 guides the sheet S downward and then the sheet reversal conveyor 26 reverses the sheet S. Then, the reversed sheet S is sent again to the transfer position by a sheet refeed path 27.

An after-treatment device such as a device for folding or stapling the sheet S may be provided downstream of the pair of discharge rollers 25.

[Control System Configuration of the Image Forming Apparatus]

Next, the control system configuration of the image forming apparatus 2 will be described referring to FIG. 3. FIG. 3 is a block diagram which shows the control system configuration of the image forming apparatus 2.

As shown in FIG. 3, the image forming apparatus 2 has a controller 100. The controller 100 is mounted on the control board 80 shown in FIG. 2.

For example, the controller 100 includes a CPU (Central Processing Unit) 101, a ROM (Read Only Memory) 102 to store a program, etc. to be executed by the CPU 101, and a RAM (Random Access Memory) 103 to be used as a working area for the CPU 101. For the ROM 102, an electrically erasable programmable ROM may be used.

The controller 100 is connected to the image reader 30, image processor 36, image forming section 40, paper feeder 21, fixing section 70, a HDD (Hard Disk Drive) 91 as an example of a storage, an operation display 92, and a communication section 93 through a system bus 94 to control the entire image forming apparatus 2.

Specifically, the image forming apparatus 2 performs the following operations and processing steps under the control by the controller 100. Namely, the image reader 30 reads the image of the original G or the original placed on the original holder 31 and generates image data. The image data generated by the image reader 30 or image data sent from an external device connected to the image forming apparatus 2 is sent to the image processor 36. The image processor 36 performs image processing tasks such as shading correction, image density adjustment, and image compression on the received image data as necessary.

The image forming section 40 forms a toner image on the intermediate transfer belt 50 according to the image data generated by the image reader 30 or image data sent from the external device. The toner image is transferred to a sheet S sent by the paper feeder 21 at the secondary transfer part 60. The fixing section 70 pressurizes and heats the sheet S to fix the toner image on the sheet S.

The HDD 91 is an internal memory which stores the image data on the original image as read and acquired by the image reader 30 or stores image data which has been outputted and so on. The operation display 92 is a touch panel which combines, for example, a panel display such as a liquid crystal display (LCD) or organic EL (Electro Luminescence) display, and a position input device such as a touch pad. The operation display 92 shows a menu of instructions to the user, information related to the acquired image data and so on. In addition, the operation display 92 includes a plurality of keys and has a function as an input unit which receives data entered through key operation by the user, including various instructions, characters, and numerals.

The communication section 93 receives job information which is sent from the client PC 4 as an example of an external device through the LAN cable 3 as an example of network, and sends the received job information to the controller 100 through a system bus 94. The job information contains the image data on the image to be formed and information associated with the image data, such as the type of paper to be used and the number of sheets.

Here, the client PC4 is assumed to be employed as the external device which sends the job information, but the external device is not limited thereto. Another type of device, for example, a facsimile apparatus, may be employed as the external device.

(Functions of the Controller)

In the image forming apparatus 2 thus configured, the controller 100 has not only the function to control the image reader 30, image processor 36, and image forming section 40 but also the function explained below to suppress the decline in the speed of data transmission to the storage in combined operation of printing and scanning, etc. FIG. 4 is a functional block diagram which shows an example of the functions of the controller 100.

As shown in FIG. 4, the controller 100 includes a first acquisition part 111, a second acquisition part 112, a comparator 113, and a striping part 114 and has a striping function to distribute (divide) and store data into a plurality of storages in order to suppress the decline in the speed of data transmission to the storage.

The functions of the first acquisition part 111, second acquisition part 112, comparator 113, and striping part 114 are performed under the control by the CPU 101 (see FIG. 3) of the controller 100. The functional parts (111 to 114) of the controller 100 are described in detail below referring to FIG. 5. FIG. 5 is a diagram which explains details of the functional parts of the controller 100.

In FIG. 5, for easy understanding, two image forming apparatuses, image forming apparatus (A)2_a and image forming apparatus (B)2_b, are taken as an example of a plurality of image forming apparatuses. In the explanation below, the storage of the image forming apparatus (A)2_a and the storage of the image forming apparatus (B)2_b are referred to as HDD91_a and HDD91_b, respectively. Furthermore, the image forming apparatus (C)2_c may be used as necessary and the storage of the image forming apparatus (C)2_c is referred to as HDD91_c.

Here, the image forming apparatus (A)2_a is assumed to be a given image forming apparatus which uses image data. And, the image forming apparatus (B)2_b is assumed to be another image forming apparatus, and an explanation is given below about how the system works to distribute and store the image data into the HDD91_a of the image forming apparatus (A)2_a and the HDD91_b of the image forming apparatus (B)2_b.

The first acquisition part 111 acquires the speed of data transmission to the HDD91_a of the image forming apparatus (A)2_a and the HDD91_b of the image forming apparatus (B)2_b, namely the data transmission speeds in path 1 and path 3 shown in FIG. 5. The second acquisition part 112 acquires the data transmission speed in the LAN cable 3 which transmits data between the image forming apparatus (A)2_a and the image forming apparatus (B)2_b, namely the data transmission speed in path 2 in FIG. 5.

If the data transmission speed in the path 1 as acquired by the first acquisition part 111 is lower than a specified value, the comparator 113 compares the data transmission speed in the path 3 as acquired by the first acquisition part 111 and the data transmission speed in the path 2 as acquired by the second acquisition part 112 in the image forming apparatus (B)2_b, against a given value. Upon receipt of the result of comparison by the comparator 113 that the data transmission speed in the path 3 and the data transmission speed in the path 2 are both higher than the given value, the striping part 114 performs striping to distribute and store the data into the HDD91_a of the image forming apparatus (A)2_a and the HDD91_b of the image forming apparatus (B)2_b.

In the above example, the image forming apparatus (B)2_b is used as another image forming apparatus to which data is distributed in striping. However, instead of one image forming apparatus, two or more image forming apparatuses may be used as other image forming apparatuses. If the storages of two or more image forming apparatuses are used for striping, the volume of data to be stored in each storage can be decreased so that the load on each image forming apparatus to stole distributed data can be reduced.

Here, the specified value may be the lower limit of the speed of data transmission (access speed) to the storage (HDD in this example) which is required to meet the specified printing speed for several image forming apparatuses (hereinafter sometimes referred to as "specified printing speed"). Alternatively, the specified value may be the lower limit of the speed of data transmission to the storage which is required to meet the specified reading speed for several image forming apparatuses.

The given value as a comparison criterion for the comparator 113 may be the above specified value, namely a specified value which can meet the specified printing speed. Alternatively, the given value may be not the above specified value but the data transmission speed in the path 1 as acquired by the first acquisition part 111 of the image forming apparatus (A)2_*a* as a given image forming apparatus. This means that when the data transmission speed in the path 3 and the data transmission speed in the path 2 are higher than the data transmission speed in the path 1, an effect of striping can be produced and thus striping can be performed even if the above specified value is not met.

Next, an explanation will be given of concrete examples of suppressing the decline in the speed of data transmission to the storage due to combined operation of printing and scanning, etc.

For instance, the operating environment/conditions for the above image forming system 1 are assumed as follows:

Specified printing speed for the image forming apparatus (A): 100 [PPM] (100 pages/minute)
    Data size per page: 80 [MB]
    Access speed in path 1: 200 [MB/s]
    Access speed in path 3: 200 [MB/s]
    Data transmission speed in path 2: 1250 [MB/s](10-gigabit Ethernet)

Under the above conditions, the required speed of access to the HDD91_*a* and HDD91_*b* to meet the specified printing speed (100 [PPM]) is as follows:

$$80/(60/100)=133.3 \text{ [MB/s]}$$

Example 1

Example 1 is an example of operation in the case that the speed of data transmission to the storage does not meet the specified printing speed due to combined operation of printing and scanning in the image forming apparatus (A)2_*a*.

In the image forming apparatus (A)2_*a*, usually the speed of access to the HDD91_*a* is 200 [MB/s], which exceeds the specified transmission speed (access speed) of 133.3 [MB/s] and thus meets the specified printing speed. However, in the case of combined operation, the speed of access to the HDD91_*a* declines due to excessive access to the HDD91_*a*. If the speed of access to the HDD91_*a* goes down to 100 [MB/s] due to combined operation, the speed is lower than the specified transmission speed of 133.3 [MB/s] and does not meet the specified printing speed.

For this reason, in Example 1, in combined operation, the system checks whether or not the speed of access to the HDD91_*b* of the image forming apparatus (B)2_*b* and the data transmission speed between the image forming apparatus (A)2_*a* and the image forming apparatus (B)2_*b* are higher than the specified transmission speed of 133.3 [MB/s]. In this case, since both the speeds are higher than 133.3 [MB/s], striping is performed with the HDD91_*a* of the image forming apparatus (A)2_*a* and the HDD91_*b* of the image forming apparatus (B)2_*b*.

Figure 6:
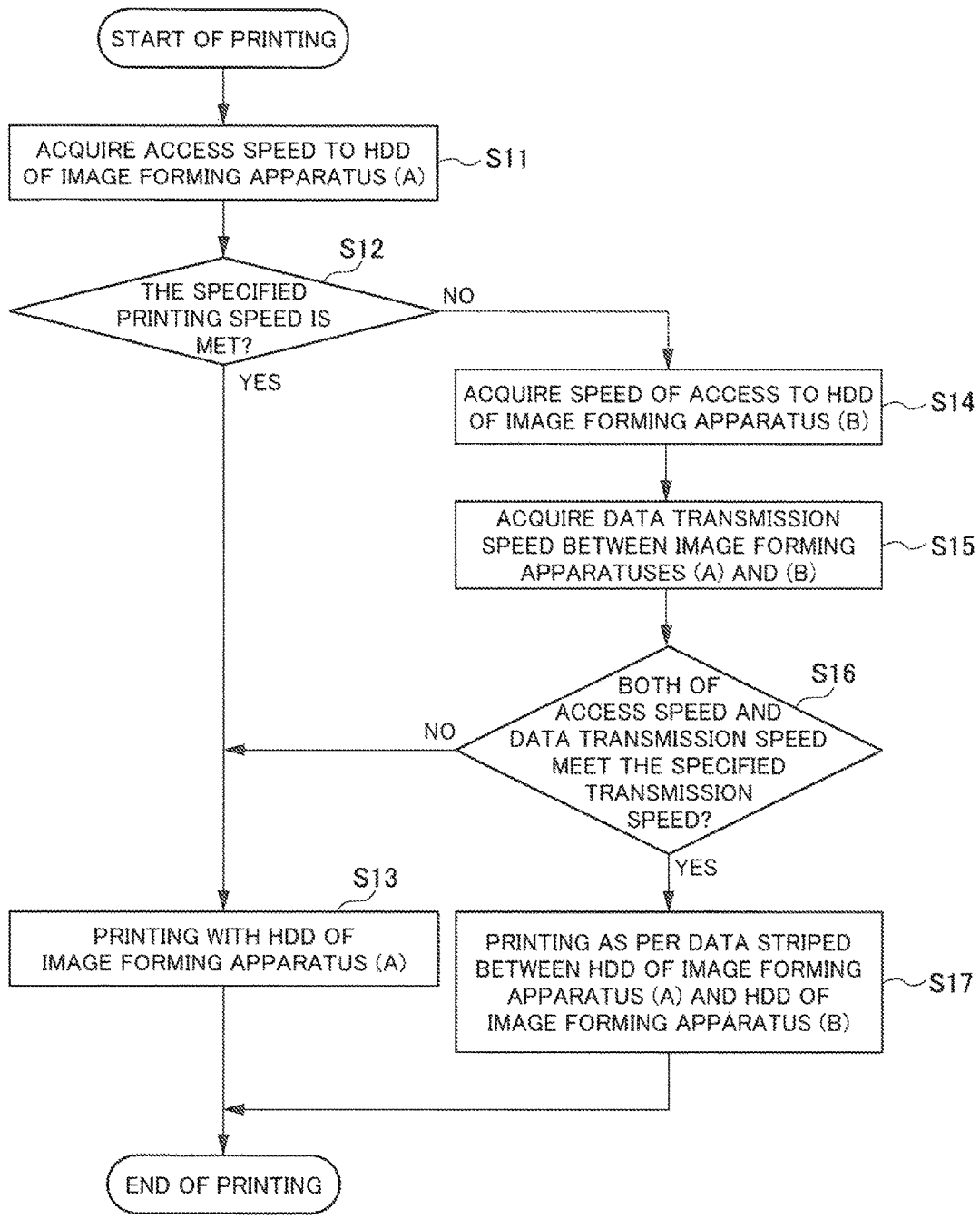
FIG. 6 is a flowchart which shows an example of the processing sequence in Example 1.

Next, the concrete processing steps of Example 1 will be described referring to FIG. 6. FIG. 6 is a flowchart which shows an example of the processing sequence in Example 1. The series of steps of Example 1 are carried out under the control by the CPU 101 (see FIG. 3) of the controller 100 of the image forming apparatus (A)2_*a*.

In the image forming apparatus (A)2_*a*, as printing is started, the CPU 101 acquires the speed of access to the HDD91_*a* of the image forming apparatus (A)2_*a*, namely the data transmission speed in the path 1 in FIG. 5 (Step S11) and then determines whether or not the access speed meets the specified printing speed (Step S12). If the speed of access to the HDD91_*a* meets the specified printing speed (Yes at S12), the CPU 101 causes printing to be performed with the HDD91_*a* of the image forming apparatus (A)2_*a* (Step S13) and then ends printing.

If the speed of access to the HDD91_*a* of the image forming apparatus (A)2_*a* does not meet the specified printing speed (No at S12), the CPU 101 acquires the speed of access to the HDD91_*b* of the image forming apparatus (B)2_*b* from the image forming apparatus (B)2_*b*, namely the data transmission speed in the path 3 in FIG. 5 (Step S14). Then, the CPU 101 acquires the data transmission speed between the image forming apparatus (A)2_*a* and the image forming apparatus (B)2_*b*, namely the data transmission speed in the path 2 in FIG. 5 (Step S15).

Next, the CPU 101 determines whether or not the speed of access to the HDD91_*b* and the data transmission speed between the image forming apparatus (A)2_*a* and the image forming apparatus (B)2_*b* both meet the specified transmission speed (Step S16). If neither of them does not meet the specified transmission speed (No at S16), the CPU 101 proceeds to Step S13 and causes printing to be performed with the HDD91_*a* of the image forming apparatus (A)2_*a*. If both meet the specified transmission speed (Yes at S16), the CPU 101 performs striping between the HDD91_*a* of the image forming apparatus (A)2_*a* and the HDD91_*b* of the image forming apparatus (B)2_*b* and causes printing to be performed according to the striped data (Step S17) and then ends printing.

As mentioned above, in Example 1, if the speed of access to the HDD91_*b* of the image forming apparatus (B)2_*b* and the data transmission speed between the image forming apparatus (A)2_*a* and the image forming apparatus (B)2_*b* are both higher than the specified transmission speed of 133.3 [MB/s], striping is performed with the HDD91_*a* and the HDD91_*b*. Consequently, the speed of data transmission to the storage can be increased to the allowable speed (twice in the present example), so the decline in the printing speed due to the decline in the speed of data transmission to the storage can be suppressed without user intervention such as installation of an additional HDD by the user.

Example 2

Example 2 is an example of operation in the case that the power of the image forming apparatus (B)2_*b* having striped image data is turned off.

Here, it is assumed that the speed of access to the HDD91_*b* does not meet the specified reading speed for the image reader 30 during scanning operation of the image forming apparatus (A)2_*a*. In this case, through processing in Example 1, the image data is stored in the HDD91_*a* of the image forming apparatus (A)2_*a* and the HDD91_*b* of the image forming apparatus (B)2_*b* by striping.

Figure 7:
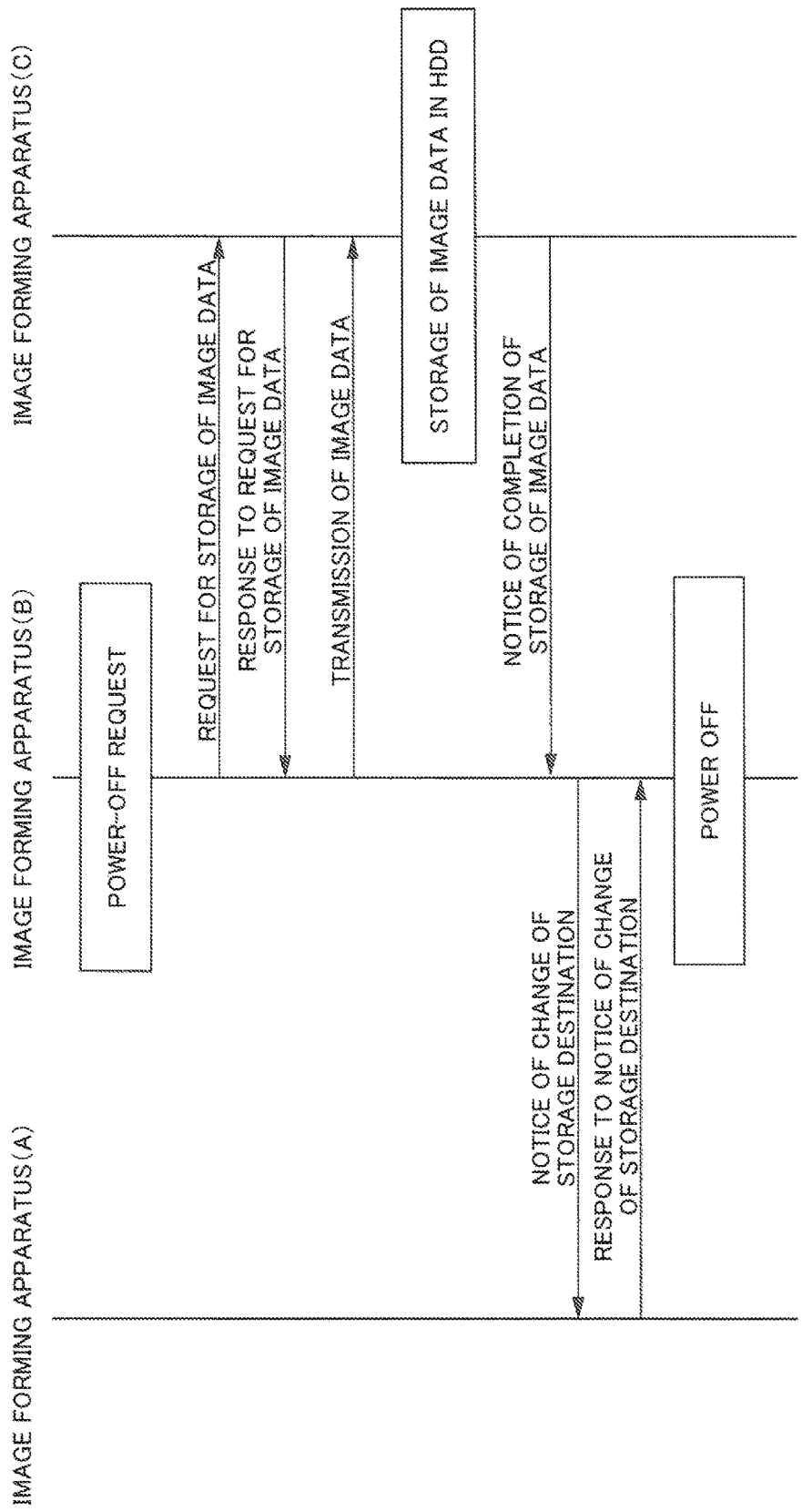
FIG. 7 is a ladder diagram which conceptually shows an example of operation in Example 2.

In Example 2, after the image data is stored in the HDD91_*b* of the image forming apparatus (B)2_*b* by striping, the storage into which the image data in the HDD91_*b* is stored (storage destination) is changed when the power of the image forming apparatus (B)2_*b* is turned off. Specifically, as shown in FIG. 7, the image data in the HDD91_*b* is transmitted to an image forming apparatus other than the image forming apparatus (B)2_*b*, for example, the HDD91_*c* of the image forming apparatus (C)2_*c*. At this time, the image forming apparatus (B)2_*b* notifies the image forming apparatus (A)2_*a* that the storage destination to store the striped data has been changed to the image forming apparatus (C)2_*c*. Then, in the image forming apparatus (B)2_*b*, after notification of change of the storage destination to the image forming apparatus (A)2_*a* is completed, the power is turned off.

In this example, when the power of the image forming apparatus (B)2_*b* is turned off, the storage destination for the image data in the HDD91_*b* is changed to the HDD91_*c* of the image forming apparatus (C)2_*c*. However, when the image forming apparatus (A)2_*a* is in an idle state, the storage destination may be changed to the HDD91_*a* of the image forming apparatus (A)2_*a*. This reduces the load which the image forming apparatus (C)2_*c* bears to store the divided image data from the image forming apparatus (A)2_*a*.

Next, the concrete processing steps of Example 2 will be described referring to FIG. 8. FIG. 8 is a flowchart which shows an example of the processing sequence in Example 2. The series of steps of Example 2 are carried out under the control by the CPU 101 (see FIG. 3) of the controller 100 of the image forming apparatus (B)2_*b*.

In the image forming apparatus (B)2_*b*, the CPU 101 determines whether the power is off or not (Step S21) and if the power is off (Yes at S21), the CPU 101 gives a request for storage of image data to an image forming apparatus other than the image forming apparatus (A)2_*a* and the image forming apparatus (B)2_*b*, for example, the image forming apparatus (C)2_*c* (Step S22). Then, the CPU 101 determines whether or not the image forming apparatus (C)2_*c* returns a response that the image forming apparatus (C)2_*c* can store the image data (Step S23) and if the image forming apparatus (C)2_*c* returns no response (No at S23), the CPU 101 goes back to Step S22 and gives a request for storage of image data again.

If the image forming apparatus (C)2_*c* returns a response that the image forming apparatus (C)2_*c* can store image data (Yes at S23), the CPU 101 transmits image data to the image forming apparatus (C)2_*c* (Step S24) and waits for a notice of completion of storage from the image forming apparatus (C)2_*c* (Step S23). If the image forming apparatus (C)2_*c* gives a notice of completion of storage (Yes at S23), the CPU 101 gives a notice of change of the storage destination for the image data to the image forming apparatus (A)2_*a* which is going to use the image data (Step S26) and waits for response to the notice of change of the storage destination from the image forming apparatus (A)2_*a* (Step S27).

Then, if the image forming apparatus (A)2_*a* returns a response to the notice of change of the storage destination (Yes at S27), the CPU 101 turns off the power (Step S28) and ends the series of steps to turn off the power of the image forming apparatus (B)2_*b* which stores the striped data. At this time, the main power supply may be turned off or the sub power supply for shift to the power saving mode may be turned off.

Example 3

Example 3 is an example of operation in the case that the power of the image forming apparatus (B)2_*b* having striped image data is off.

In Example 3 as well, as in Example 2, it is assumed that during scanning operation of the image forming apparatus (A)2_*a*, image data is stored in the HDD91_*a* of the image forming apparatus (A)2_*a* and the HDD91_*b* of the image forming apparatus (B)2_*b* by striping.

After image data is stored in the HDD91_*b* of the image forming apparatus (B)2_*b* by striping, when the image forming apparatus (A)2_*a* tries to read the image data stored in the HDD91_*b*, if the sub power supply of the image forming apparatus (B)2_*b* is off, the image forming apparatus (A)2_*a* cannot read the image data from the HDD91_*b* and cannot use the image data.

Therefore, in Example 3, as shown in FIG. 9, the image forming apparatus (A)2_*a*, going to use the image data, remotely starts only the function to access the HDD91_*b* of the image forming apparatus (B)2_*b*, by sending a request for start of reading of image data to the image forming apparatus (B)2_*b*. Then, the image data stored in the HDD91_*b* of the image forming apparatus (B)2_*b* is read and transmitted from the image forming apparatus (B)2_*b* to the image forming apparatus (A)2_*a*. Consequently, the image forming apparatus (A)2_*a* can use the image data stored in the HDD91_*b* even if the sub power supply of the image forming apparatus (B)2_*b* is off.

Next, the concrete processing steps of Example 3 will be described referring to FIG. 10. FIG. 10 is a flowchart which shows an example of the processing sequence in Example 3. The series of steps of Example 3 are carried out under the control by the CPU 101 (see FIG. 3) of the controller 100 of the image forming apparatus (B)2_*b*.

In the image forming apparatus (B)2_*b*, when the sub power supply is off, the CPU 101 monitors whether or not there is a notice to ask for start of reading of image data from the image forming apparatus (A)2_*a* (Step S31). If there is a notice to ask for start of reading of image data (Yes at S31), the CPU 101 starts only the function to access the HDD91_*b* (Step S32) and then notifies the image forming apparatus (A)2_*a* of completion of preparations for reading of image data (Step S33).

Then, the CPU 101 waits for a request for reading of image data from the image forming apparatus (A)2_*a* (Step S34) and if there is a request for reading (Yes at S34), the image data is read from the HDD91_*b* (Step S35). Then, the CPU 101 transmits the read image data from the HDD91_*b* to the image forming apparatus (A)2_*a* (Step S36), then turns off the function to access the HDD91_*b* (Step S37), and then ends the series of steps in the case that the power of the image forming apparatus (B)2_*b* is off.

Example 4

Example 4 is an example of operation in the case that the image forming apparatus (A)2_*a* having striped image data enters into an idle state.

In Example 4 as well, as in Example 2, it is assumed that during scanning operation of the image forming apparatus (A)2_*a*, image data is stored in the HDD91_*a* of the image forming apparatus (A)2_*a* and the HDD91_*b* of the image forming apparatus (B)2_*b* by striping.

After striping, when the image forming apparatus (A)2_*a* enters into the idle state, a notice to ask for return of image data is given to the image forming apparatus (B)2_*b* as shown in FIG. 11. Upon receipt of this notice, the image forming apparatus (B)2_b checks the condition of the image forming apparatus (B)2_b and if the image forming apparatus (B)2_b can return data, the image forming apparatus (B)2_b transmits the image data in the HDD91_b to the image forming apparatus (A)2_a. The image forming apparatus (A)2_a restores the returned image data from the image forming apparatus (B)2_b to a piece of unstriped data and stores the data in the HDD91_a.

Thus, when the image forming apparatus (A)2_a enters into the idle state, the image data in the HDD91_b of the image forming apparatus (B)2_b is returned to the image forming apparatus (A)2_a so that when the power of the image forming apparatus (B)2_b is turned off, a failure to read the image data from the HDD91_b can be prevented. When the image forming apparatus (B)2_b returns data, preferably the image forming apparatus (B)2_b should be in an idle state in which no processing work is underway. The reason is that if so, no load is put on the image forming apparatus (B)2_b.

Next, the concrete processing steps of Example 4 will be described referring to FIG. 12. FIG. 12 is a flowchart which shows an example of the processing sequence in Example 4. The series of steps of Example 4 are carried out under the control by the CPU 101 (see FIG. 3) of the controller 100 of the image forming apparatus (A)2_a.

In the image forming apparatus (A)2_a, when the image forming apparatus (A)2_a enters into the idle state, the CPU 101 gives a notice to ask for return of image data to the image forming apparatus (B)2_b (Step S41). Upon receipt of this notice, the image forming apparatus (B)2_b checks the condition of the image forming apparatus (B)2_b and if the image forming apparatus (B)2_b can return the data, for example, it is in the idle state, etc., the image forming apparatus (B)2_b returns a positive response to the image forming apparatus (A)2_a.

The CPU 101 waits for a positive response from the image forming apparatus (B)2_b (Step S42) and if the CPU 101 receives a positive response (Yes at S42), the CPU 101 requests the image forming apparatus (B)2_b to return the image data (Step S43). Then, the CPU 101 receives the image data which the image forming apparatus (B)2_b has returned upon receipt of the request for return from the image forming apparatus (A)2_a (Step S44), and restores the received image data to a piece of unstriped image data (Step S45).

Then, the CPU 101 stores the image data restored to a piece of unstriped data in the HDD91_a (Step S46), and then ends the series of steps in the case that the image forming apparatus (A)2_a enters into the idle state.

Example 5

Example 5 is a variation of Example 1 as an example of operation in the case that importance is placed on security.

Example 5 addresses the case that when the security function of the image forming apparatus (A)2_a going to use image data is valid, the same situation as in Example 1 occurs, namely the speed of access to the HDD91_a of the image forming apparatus (A)2_a does not meet the specified printing speed.

In this case, if the security function of the image forming apparatus (B)2_b is invalid, the system checks whether the security function of each of the image forming apparatus (C)2_c and the image forming apparatus (D)2_d on the same LAN cable 3 as the image forming apparatus (A)2_a is valid or invalid. Then, as a result of check, if it is found that only the security function of the image forming apparatus (C)2_c is valid, the system enables striping between the HDD91_a of the image forming apparatus (A)2_a and the HDD91_c of the image forming apparatus (C)2_c. This makes the system a security-oriented system.

Next, the concrete processing steps of Example 5 will be described referring to FIG. 13, on the assumption that only the security function of the image forming apparatus (C)2_c is valid. FIG. 13 is a flowchart which shows an example of the processing sequence in Example 5. The series of steps of Example 5 are carried out under the control by the CPU 101 (see FIG. 3) of the controller 100 of the image forming apparatus (A)2_a.

In the image forming apparatus (A)2_a, as printing is started, the CPU 101 acquires the speed of access to the HDD91_a of the image forming apparatus (A)2_a (Step S51) and determines whether or not the access speed meets the specified printing speed (Step S52). If the speed of access to the HDD91_a meets the specified printing speed (Yes at S52), the CPU 101 causes printing to be performed with the HDD91_a of the image forming apparatus (A)2_a (Step S53) and then ends printing.

If the speed of access to the HDD91_a of the image forming apparatus (A)2_a does not meet the specified printing speed (No at S52), the CPU 101 acquires the speed of access to the HDD91_c of the image forming apparatus (C)2_c from the image forming apparatus (C)2_c (Step S54). Then, the CPU 101 acquires the data transmission speed between the image forming apparatus (A)2_a and the image forming apparatus (C)2_c (Step S55).

Then, the CPU 101 determines whether or not the speed of access to the HDD91_c and the data transmission speed between the image forming apparatus (A)2_a and the image forming apparatus (C)2_c both meet the specified transmission speed (Step S56). If neither of them meets the specified transmission speed (No at S56), the CPU 101 proceeds to Step S53 and causes printing to be performed with the HDD91_a of the image forming apparatus (A)2_a.

If both meet the specified transmission speed (Yes at S56), the CPU 101 determines whether or not the security function of the image forming apparatus (C)2_c is valid (Step S57) and if invalid (No at S57), the CPU 101 proceeds to Step S53 and causes printing to be performed with the HDD91_a of the image forming apparatus (A)2_a. If the security function of the image forming apparatus (C)2_c is valid (Yes at S57), the CPU 101 performs striping of data between the HDD91_a of the image forming apparatus (A)2_a and the HDD91_c of the image forming apparatus (C)2_c and causes printing to be performed according to the striped data (Step S58) and then ends printing.

Example 6

Example 6 is a variation of Example 1 as an example of operation in the case that the amounts of free space on HDD91_a to HDD91_c are taken into consideration.

Like Example 1, Example 6 addresses the case that the speed of access to the HDD91_a of the image forming apparatus (A)2_a does not meet the specified printing speed. In this case, the system checks the amount of free space on each of the HDD91_a of the image forming apparatus (A)2_a, the HDD91_b of the image forming apparatus (B)2_b, the HDD91_c of the image forming apparatus (C)2_c, and the HDD91_d of the image forming apparatus (D)2_d.

As a result of check, if the amount of free space on the HDD91_c of the image forming apparatus (C)2_c and that on the HDD91_d of the image forming apparatus (D)2_d are large, striping is performed between the HDD91_c and the HDD91_d. Consequently, when the amount of free space on the HDD of an image forming apparatus is small, the load which the image forming apparatus might bear if the HDD should be used for striping is avoided.

Next, the concrete processing steps of Example 6 in the above case will be described referring to FIG. 14. FIG. 14 is a flowchart which shows an example of the processing sequence in Example 6. The series of steps of Example 6 are carried out under the control by the CPU 101 (see FIG. 3) of the controller 100 of the image forming apparatus (A)2_a.

In the image forming apparatus (A)2_a, as printing is started, the CPU 101 acquires the speed of access to the HDD91_a of the image forming apparatus (A)2_a (Step S61) and determines whether or not the access speed meets the specified printing speed (Step S62). If the speed of access to the HDD91_a meets the specified printing speed (Yes at S62), the CPU 101 causes printing to be performed with the HDD91_a of the image forming apparatus (A)2_a and then ends printing.

If the speed of access to the HDD91_a of the image forming apparatus (A)2_a does not meet the specified printing speed (No at S62), the CPU 101 acquires the speed of access to the HDD91_b of the image forming apparatus (B)2_b, the HDD91_c of the image forming apparatus (C)2_c, and the HDD91_d of the image forming apparatus (D)2_d (Step S64). Then, the CPU 101 acquires the data transmission speed between the image forming apparatus (A)2_a and the image forming apparatus (B)2_b, between the image forming apparatus (A)2_a and the image forming apparatus (C)2_c and between the image forming apparatus (A)2_a and the image forming apparatus (D)2_d (Step S65).

Then, the CPU 101 determines whether or not the access speeds acquired at Step S64 and the data transmission speeds acquired at Step S65 meet the specified transmission speed (Step S66). If neither of the speeds meets the specified transmission speed (No at S66), the CPU 101 proceeds to Step S63 and causes printing to be performed with the HDD91_a of the image forming apparatus (A)2_a. If all the speeds meet the specified transmission speed (Yes at S66), the CPU 101 compares the amount of free space among the HDD91_a of the image forming apparatus (A)2_a, the HDD91_b of the image forming apparatus (B)2_b, the HDD91_c of the image forming apparatus (C)2_c, and the HDD91_d of the image forming apparatus (D)2_d (Step S67).

Then, the CPU 101 performs striping between two HDDs with a large amount of free space, for example, the HDD91_c of the image forming apparatus (C)2_c and the HDD91_d of the image forming apparatus (D)2_d, causes printing to be performed according to the striped data (Step S68) and then ends printing.

Variations

Although embodiments of the present invention have been so far explained, the invention is not limited thereto. The above embodiments may be altered or modified in various ways without departing from the gist of the invention. Such altered or modified embodiments may also be within the technical scope of the invention.

For example, the above embodiments have been described on the assumption that the image forming apparatus 2 according to an embodiment of the present invention is a copier, but the invention is not limited to the above examples. The present invention can be applied not only to a copier but also to any other type of image forming apparatus which has an internal memory or external memory as a storage, such as a combined machine with various functions including copying, printing and facsimile functions. In the above embodiments, the storage is exemplified by an HDD, but the storage is not limited thereto. It may be another type of memory such as SSD.

Although embodiments of the present invention have been described and illustrated in detail, the disclosed embodiments are made for purposes of illustration and example only and not limitation. The scope of the present invention should be interpreted by terms of the appended claims.

REFERENCE SIGNS LIST

1 . . . image forming system,
2(2_a, 2_b, 2_c, 2_d) . . . image forming apparatus,
3 . . . LAN cable,
4 . . . client PC,
10 . . . original conveyor,
20 . . . paper case,
30 . . . image reader,
36 . . . image processor,
40 . . . image forming section,
50 . . . intermediate transfer belt,
60 . . . secondary transfer part,
70 . . . fixing section,
80 . . . control board,
100 . . . controller
111 . . . first acquisition part,
112 . . . second acquisition part,
113 . . . comparator,
114 . . . striping part

What is claimed is:

1. An image forming system in which a plurality of image forming apparatuses are connected on a network, the image forming apparatuses each comprising:
a first acquisition part acquiring a speed of data transmission to a storage of each image forming apparatus;
a second acquisition part acquiring a data transmission speed between the image forming apparatuses; and
a striping part which, when in a given image forming apparatus among the image forming apparatuses the data transmission speed acquired by the first acquisition part is lower than a specified value, if in another image forming apparatus the data transmission speed acquired by the first acquisition part and the data transmission speed acquired by the second acquisition part are both higher than a given value, distributes and stores data into the storage of the given image forming apparatus and the storage of the other image forming apparatus.

2. The image forming system according to claim 1, wherein the specified value is a lower limit value of speed of data transmission to the storage which is required to meet a specified printing speed for the image forming apparatuses.

3. The image forming system according to claim 1, wherein the specified value is a lower limit value of speed of data transmission to the storage which is required to meet a specified reading speed for the image forming apparatuses.

4. The image forming system according to claim 2, wherein the given value is the specified value.

5. The image forming system according to claim 1, wherein the given value is a data transmission speed acquired by the first acquisition part of the given image forming apparatus.

6. The image forming system according to claim 1, wherein in the other image forming apparatus, when power supply is turned off, data stored in the storage of the other image forming apparatus is transmitted to the storage of an image forming apparatus other than the other image forming apparatus.

7. The image forming system according to claim 1, wherein in the other image forming apparatus, when sub power supply is off, only a function to access the storage is started in response to an instruction from the given image forming apparatus.

8. The image forming system according to claim 1, wherein when the given image forming apparatus enters into an idle state, the given image forming apparatus requests the other image forming apparatus to return data stored in the storage of the other image forming apparatus and restores the returned data from the other image forming apparatus to a piece of unstriped data.

9. The image forming system according to claim 1, wherein the striping part selects, as an object of striping, the storage of an image forming apparatus in which a security function is valid, among the other image forming apparatuses.

10. The image forming system according to claim 1, wherein the striping part checks an amount of free space on the storage of each of the other image forming apparatuses and selects a storage with the largest amount of free space as an object of striping.

11. A method for controlling an image forming system in which a plurality of image forming apparatuses are connected on a network, the method using a non-transitory computer-readable storage medium storing a program causing a computer to perform:
acquiring a speed of data transmission to a storage of each of the image forming apparatuses;
acquiring a data transmission speed between the image forming apparatuses; and
when the speed of data transmission to the storage of a given image forming apparatus among the image forming apparatuses is lower than a specified value, if the speed of data transmission to the storage of another image forming apparatus and the data transmission speed between the image forming apparatuses are both higher than a given value, distributing and storing data into the storage of the given image forming apparatus and the storage of the other image forming apparatus.

* * * * *